(12) United States Patent
Jarman

(10) Patent No.: US 12,164,356 B2
(45) Date of Patent: Dec. 10, 2024

(54) SYSTEMS AND METHODS FOR MONITORING DEVICE NON-USAGE

(71) Applicant: Matthew Jarman, Millcreek City, UT (US)

(72) Inventor: Matthew Jarman, Millcreek City, UT (US)

( * ) Notice: Subject to any disclaimer, the term of this patent is extended or adjusted under 35 U.S.C. 154(b) by 0 days.

(21) Appl. No.: 17/655,618

(22) Filed: Mar. 21, 2022

(65) Prior Publication Data

US 2022/0365584 A1    Nov. 17, 2022

Related U.S. Application Data

(60) Provisional application No. 63/163,196, filed on Mar. 19, 2021.

(51) Int. Cl.
*G06F 1/3215*    (2019.01)
*H02J 7/00*    (2006.01)

(52) U.S. Cl.
CPC .......... *G06F 1/3215* (2013.01); *H02J 7/0048* (2020.01)

(58) Field of Classification Search
CPC .......... G06F 1/3215; G06F 1/263; G06F 1/28; G06F 3/04847; H02J 7/0048; H02J 7/0036; H02J 7/0047; H02J 7/0068; H02J 7/00034
See application file for complete search history.

(56) References Cited

U.S. PATENT DOCUMENTS

| | | | | |
|---|---|---|---|---|
| 9,680,318 | B2* | 6/2017 | Carkner | H02J 7/0042 |
| 10,897,144 | B1* | 1/2021 | Patton | H02J 7/0019 |
| 2012/0054098 | A1* | 3/2012 | Yu | G06Q 20/102 |
| | | | | 705/40 |
| 2013/0314037 | A1* | 11/2013 | Caffy | H02J 7/0071 |
| | | | | 320/109 |
| 2015/0249357 | A1* | 9/2015 | Wu | H02J 7/007188 |
| | | | | 320/155 |
| 2015/0364946 | A1* | 12/2015 | Wang | H02J 50/10 |
| | | | | 455/573 |
| 2020/0393516 | A1* | 12/2020 | Gao | H02J 7/0048 |
| 2022/0194253 | A1* | 6/2022 | Salter | B60L 53/18 |

* cited by examiner

*Primary Examiner* — Zhipeng Wang

(57) ABSTRACT

Systems and methods for monitoring hands-free metrics of personal electronic devices are disclosed. Connection of a personal electronic device to a charging circuit is detected and identified to a particular personal electronic device. Connections of each personal electronic device are aggregated and rendered to a display to provide feedback and gamification of periods of non-use of the personal electronic devices. Gamification is employed to promote non-use of the personal electronic devices.

17 Claims, 3 Drawing Sheets

SYSTEMS AND METHODS FOR MONITORING DEVICE NON-USAGE

RELATED APPLICATIONS

The present application claims the benefit of priority under 35 U.S.C. § 119(e) of U.S. Provisional Patent Application No. 63/163,196 entitled DEVICE USAGE TRACKER, filed Mar. 19, 2021, which is hereby incorporated herein by reference in its entirety.

TECHNICAL FIELD

The present disclosure relates generally to monitoring of personal portable electronic computing devices, and more specifically, to monitoring individual non-usage of a personal portable electronic computing device for a plurality of individuals.

BACKGROUND

Proliferation of personal electronic devices (e.g., Internet-connected "smartphones," tablet computers, etc.) and applications on those devices has created a problem where people are spending too much time in the digital world and not enough time outside the digital world. A Netflix documentary, The Social Dilemma (Orlowski, J. (Director). (2020). [Film] Netflix), details how applications on personal electronic devices are designed to attract and hold the users attention for extended periods of time. As a user's time dedication to these applications increases, real world productivity of the user (a user of any age) may radically decrease, leading to an adverse impact on the user's educational experience, work opportunities, quality of life, etc.

SUMMARY

The present disclosure provides inducement for an individual of a plurality of individuals to advantageously reduce time spent using a personal electronic computing device and increase time involved in real world activities. The present disclosure provides for "gamification" whereby a group of individuals, e.g., a family, may improve their real world experiences by competing to create meaningful reductions in time spent in the digital realm of personal electronic computing devices.

Additional aspects and advantages will be apparent from the following detailed description of preferred embodiments, which proceeds with reference to the accompanying drawings.

DETAILED DESCRIPTION

The inventions disclosed herein provide incentive for individual users of a plurality individual users of personal electronic devices to put the device down and be rewarded for time not spent on the personal electronic device. Said otherwise, the individual user is motivated to reduce time spent using the individual user's personal electronic device through a means of gamification among a plurality of individual users.

As used herein, "personal electronic device" (device) refers to a handheld personal computing device, such as, e.g., an Internet-capable telephone (smartphone), a tablet computing device (tablet), an electronic gaming device, etc.

As used herein, "coupled" refers to a physical or electrical connection between two or more components. A physical connection may comprise two or more components physically touching or being in proximity to each other, or being interconnected as by another component. An electrical connection is any connection whereby electrical power or an electrical signal is permitted or caused to flow from one component to one or more other components.

As used herein, the terms "tabulate" and "aggregate" refer to mathematically processing data to produce a datum or data. In other words, tabulate and aggregate each refers to quantifying a plurality of values to a value, such as, e.g., additively, multiplicatively, derivatively, etc. The terms tabulate and aggregate may be used interchangeably in the present disclosure without conferring disparate meaning.

Figure 1:
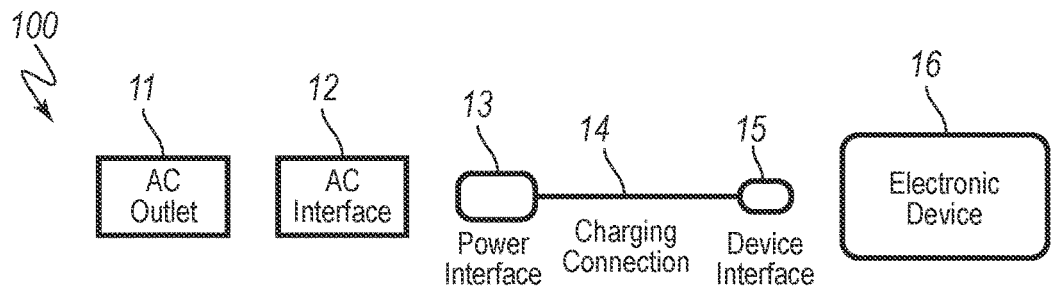
FIG. 1 is a system diagram of a presently available system for charging a personal electronic device.

FIG. 1 is a system diagram of a presently available system 100 for charging a personal electronic device (device) 16. The system 100 comprises an alternating current (AC) outlet 11, an AC interface 12, a power interface 13, a charging connection 14, a device interface 15, and the device 16. The AC outlet 11 may be an electrical box capable of providing AC power to a power consuming item. The AC interface 12 may be connectable interface (e.g., an electrical plug) permitting electrical coupling, for example, of a power cord of a device or appliance to the AC outlet 11. The power interface 13 may be a component that electrically couples a power-consuming item to the AC interface 12 and may alter the electrical power received from the AC interface 12. In the present example, the power interface 13 may be a charger for the device 16 which converts AC power to direct current (DC) power at a particular amperage for the device 16. The charging connection 14 represents a conduit whereby power, e.g., DC power, is provided from the power interface 13 to the device interface. The charging connection 14 may be wired or wireless. The device interface 15 may be a connector serving to electrically couple the charging connection 14 to the device 16 whereby electrical power is delivered to the device. The device interface 15 may be any appropriate or device-specific plug-type connection (e.g., a universal serial bus (USB) connector, etc.) or a wireless charging solution (e.g. an inductive charging puck, etc.). The device 16 may be a personal electronic device, such as, for example, a smartphone (e.g., an Apple iPhone®, a Samsung Galaxy®, etc.), a tablet computer (e.g., an Apple iPad®, a Samsung Galaxy Tab®, an Amazon Kindle®, etc.), a handheld electronic gaming device (e.g., a Nintendo Switch®, a Nintendo Switch Lite®, etc.), etc.

Figure 2:
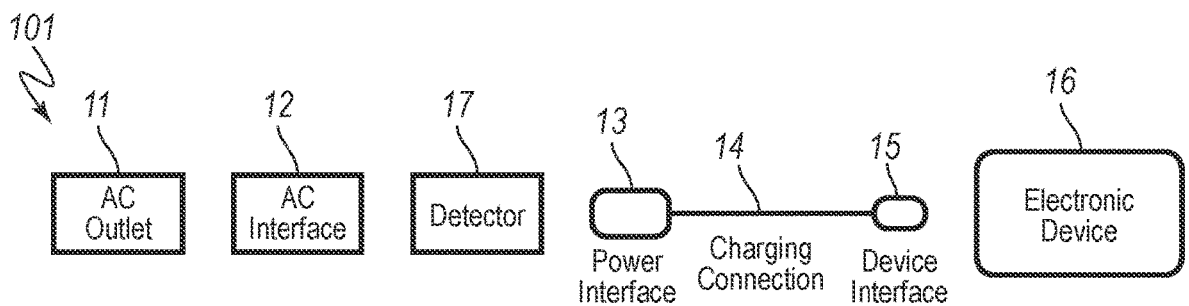
FIG. 2 is a system diagram for a non-use monitoring system (NuMS) for a device, such as the device of FIG. 1.

FIG. 2 is a system diagram for a non-use monitoring system (NuMS) 101 for a device, such as the device 16 of FIG. 1, according to an embodiment of the present disclosure. The AC outlet 11, the AC interface 12, the power interface 13, the charging connection 14, and the device interface 15 are shown for reference. A detector 17 is disposed between the AC interface 12 and the power interface 13. The detector 17 is electrically coupled to the AC interface 12 and the power interface 13. The detector 17 provides an electrical coupling between the AC interface 12 and the power interface 13. More generally stated, the detector 17 is electrically coupled, via the power interface 13, et seq., between the device 16 and the AC interface 12. The detector 17 is configured to detect when the device 16 is electrically coupled to the detector 17. In one embodiment, the detector 17 may detect that a current is drawn as a result of the device 16 being electrically coupled at the device interface 15. When the detector 17 detects that the device 16 is electrically coupled, the detector 17 may generate a signal that the device 16 is electrically coupled. This signal can then be used as a means of measuring when and how long the device 16 is electrically coupled to the detector 17. The duration that the device 16 is electrically coupled to the detector 17 may be indicative of a period of non-use of the device by a user. The detector 17 may be configured to transmit the signal indicating that the device 16 is electrically coupled to the detector 17 to a component capable of manipulating data of the signal and/or displaying data regarding the coupling of the device 16 to the detector 17. In one embodiment, the signal may be transmitted to the device 16.

By way of non-limiting example, in a home a parent may want to know that a particular device is at a particular location of the home. By placing the detector 17, the power interface 13, et seq., at an AC interface 12 at the desired location, the parent can be informed by the NuMS 101 of times and durations that the device is electrically coupled at the location.

Attributes of the connection of the electrical coupling may help identify the device based on information that is communicated through the various components (the device interface 15, the charging connection 14, the power interface 13, etc.). For example, a device might be identified by a current draw through the electrical coupling. To the extent that data is communicated through the connection of the electrical coupling, this data could also be available to identify the device 16 that has been electrically coupled.

It should be noted that the disclosure anticipates embodiments wherein the detector 17 may be placed at a different location within the NuMS 101. Disposition of the detector 17 between the AC interface 12 and the power interface 13 is but one example of a configuration of the NuMS 101 and is not a requirement or limitation. In one embodiment, the detector 17 may be disposed between the power interface 13 and the charging connection 14. In one embodiment, the detector 17 may be disposed between the charging connection 14 and the device interface 15. Furthermore, the disclosure anticipates embodiments wherein one or more of the components 11-15 may be absent, or wherein one or more of the components 11-15 may be combined into a composite component. The detector 17, in any such embodiment, may be disposed at an appropriate location between the AC outlet 11 and the device 16.

Figure 3:
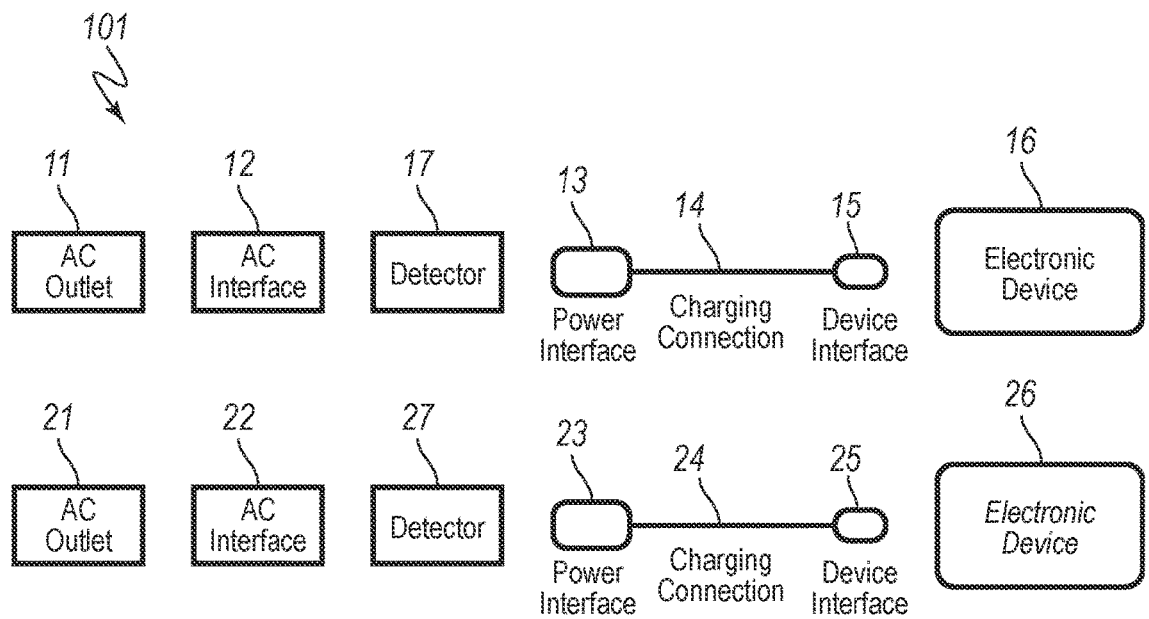
FIG. 3 is a system diagram of the NuMS of FIG. 2 having a plurality of devices.

FIG. 3 is a system diagram of the NuMS 101 of FIG. 2, according to an embodiment of the present disclosure, and having a plurality of devices 16, 26. The AC outlet 11, the AC interface 12, the detector 17, the power interface 13, the charging connection 14, the device interface 15, and the device 16 are shown for reference. A second AC outlet 21, a second AC interface 22, a second detector 27, a second power interface 23, a second charging connection 24, a second device interface 25, and a second device 26 are also shown. In one embodiment, the AC interface 12 and the second AC interface 22 may both employ the AC outlet 11. In an environment where there are multiple devices and multiple charging connections, uniquely identifiable components could be associated with the different charging connections (electrical couplings). In the embodiment of FIG. 3, the detector 27 is uniquely identifiable from the detector 17. To extend the former example, the parent may associate a child with detector 17 and the parent with detector 27. When the child connects the device 16 to the device interface 15 associated to the detector 17, the connection can be attributed to the device 16 of the child.

When a device 16, 26 is coupled to a detector 26, 27, respectively, the connection information can be communicated to a component that tabulates information about that connection. In one embodiment, the component that tabulates information about the connection may be a device 16, 26. This communication can be achieved through a wired or wireless connection. The tabulation can tabulate various attributes about the connection. The tabulation may comprise a time of day the connection was made, how long the connection was made, the date the connection was made, and any other attributes that are available through either power or data that flows through the connection. The tabulation may comprise adding together durations of multiple connections of the particular device 16, 26 to produce a total duration of connection. Various calculations meaningful in the context of promoting non-use of the device 16, 26 are anticipated by the present disclosure.

Figure 4:
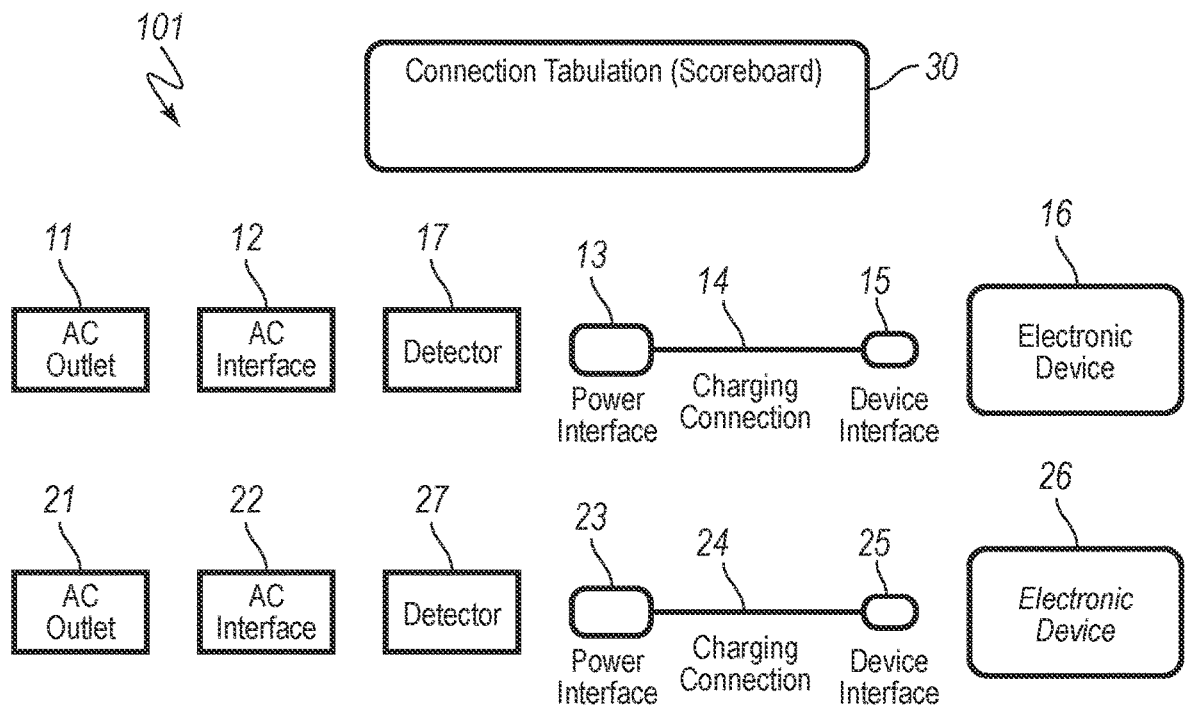
FIG. 4 is a system diagram of the NuMS of FIGS. 2 and 3 having a connection tabulator.

FIG. 4 is a system diagram of the NuMS 101 of FIGS. 2 and 3, according to an embodiment of the present disclosure, and having a connection tabulator 30. The AC outlets 11, 21, the AC interfaces 12, 22, the detectors 17, 27, the power interfaces 13, 23, the charging connections 14, 24, the device interfaces 15, 25, and the devices 16, 26 are shown for reference. The detectors 17, 27 may send a signal to the connection tabulator 30 each time a connection change is detected, such as, e.g., when a device 16, 26 is connected or disconnected. The detectors 17, 27 may send a signal each time a connection is detected, at particular intervals to indicate a connection status, when the detectors, 17, 27 detect the device 16, 26 is disconnected, and at other times or upon other triggering events. The detectors 17, 27 can also monitor whether additional power draw or data indicators indicate whether the device 16, 26 is inactive or in use (e.g., the device 16, 26 is being used while connected to the detector 17 27). Depending on indication of the device active state, points to the tabulator could be additionally regulated. For example, if the device 16, 26 is connected to the detector but is also being used, points for non-use may not be awarded, or only partial points be awarded. The connection tabulator 30 may tabulate or aggregate data regarding each connection of the devices 16, 26, such as, e.g., day, date, time, duration of connection, etc. The tabulation of the information sent to the connection tabulator 30 can be aggregated and displayed in a manner that provides user feedback.

Figure 5:
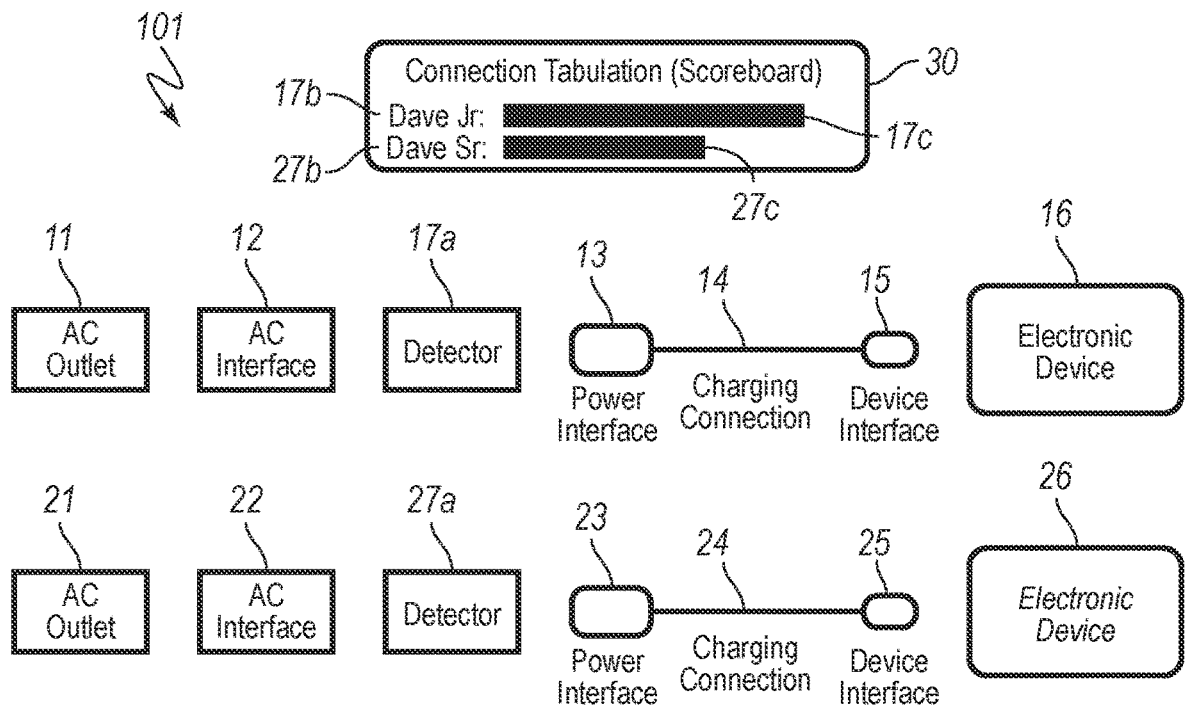
FIG. 5 is a system diagram of the NuMS of FIGS. 2-4 displaying an output reflecting non-use of the devices.

FIG. 5 is a system diagram of the NuMS 101 of FIGS. 2-4, according to an embodiment of the present disclosure, and displaying an output reflecting non-use of the devices 16, 26. The AC outlets 11, 21, the AC interfaces 12, 22, the detectors 17, 27, the power interfaces 13, 23, the charging connections 14, 24, the device interfaces 15, 25, and the devices 16, 26 are shown for reference. The calculation tabulator 30 is shown as a visual representation of the aggregation (tabulation) 17c, 27c of connections for the devices 16, 26. More particularly, the calculation tabulator 30 reflects connections of the devices 16, 26 to the respective detectors 17a, 27a.

The tabulation or aggregation 17c, 27c for each detector 17a, 27a is labeled 17b, 27b to relate each tabulation or aggregation 17c, 27c to the respective detector 17a, 27a and, hence, to the respective device 16, 26 and user. The label's 17b, 27b may be customizable, such as, to show the name of the user of the particular device. For example a child (Dave Jr) and parent (Dave Sr) could have a competition about who can have their respective device in the connection for the longest cumulative duration. The person whose device is connected the longest (in a single connection, or in aggregate) can win an agreed reward. The calculation tabulator 30 may comprise a logical scoreboard that can be displayed on an electronic device, such as a wireless digital picture frame (frame), a tablet, a computer, a phone, a device of one or more of the users, etc. For example, a user could place the frame on a counter top, wall, etc. A scoreboard image could also be displayed on a website, in an application of a device, etc. It should be noted that reference to two users and two devices 16, 26 is for convenience of the disclosure and not by way of limitation. The present disclosure anticipates that more than two users and more than two devices 16, 26 may be used with the NuMS 101.

There are multiple types of tabulation attributes that can be used to help achieve a desired result for the plurality of users (such as for a family). For example, each individual whose device 16, 26 is connected at a particular time of day may receive additional "points" on the scoreboard. In a family setting, the family may have a goal to connect each device 16, 26 at 9 pm, and a device 16, 26 connected earlier than 9 pm may receive additional "tabulation points." The family may have a combined goal that is cumulative across multiple connections, e.g., to have a cumulative connection time of 10,000 hours to go on a trip.

There can be gamification elements of tabulation. For example, the first person to connect their device 16, 26 after 3 pm receives additional points or a specific reward. Points could be subtracted from a person for disconnecting their device 16, 26 for an extended period of time, or during a designated non-use connection period (e.g., during designated overnight hours). In a head-to-head competition, points could be added to one person if another person disconnects there device 16, 26. Points could be added to a person if they maintain a particular streak for a period of time (e.g., the user keeps their device 16, 26 connected for a minimum number of hours for a minimum range of consecutive days). Notification can be sent to everyone when a member of the group connects and/or disconnects a device 16, 26. Users can issue challenges to each other. By way of example, a first user challenges a second user to connect a device 16, 26 plugged within the next five minutes, to receive an award of bonus points. The NuMS 101 by be configurable such that, randomly during a day, messages could be sent out to all the users of the NuMS 101 that whoever gets a device 16, 26 connected first in the next five minutes gets extra bonus points, or failure to connect a device 16, 26 in the declared time frame results in losing a number of points. A point algorithm could detect when a certain percentage of users' devices 16, 26 are connected, and give them all additional "team" bonus points. For example if 70% of the users have their devices 16, 26 connected, each user who is part of that 70% gets a number of bonus points. Furthermore, those whose devices 16, 26 are not connected could lose points for not being connected while a threshold of other users are connected. For those not connected, points could be subtracted over time until they connect their device 16, 26, and when they do connect their device 16, 26, all users in the group could receive a combined bonus. There could be combined bonuses when all users' devices 16, 26 are connected at the same time. For example, if all family member-users' devices 16, 26 are connected at 5 pm, they all get additional points, and/or if they all stay connected for a particular length of time, they all get an allotment of bonus points. Devices and/or people can be grouped into competitive teams. The connection behaviors of team members can then be measured and tabulated in competitive manners. For example, one school of students might compete with a different school of students to accomplish a desired combined score where the winning team achieves an agreed award, for example a discounted rate at a community retailer. These are various examples of rewarding and incentivizing behaviors based on tracking connections, connection times, and comparing that information with that of other users and their connection attributes.

Points may be tabulated or aggregated by the connection tabulator 30, by the device 16, 26 of an administrator for the NuMS 101, etc. Points may be displayable with or in place of other visual components of the display. Various goal achievements in the tabulator might unlock electronic rewards. For example, as soon as a user (e.g., a child) has obtained a specific connection goal a particular application on their device 16, 26 may become available.

The connection tabulator 30 can exist in a closed development environment, where a single provider of "tabulation" interfaces and incentives develops the software to aggregate and/or visualize the tabulation. The connection tabulator 30 can also exist in an open environment, where multiple providers of "tabulation" interfaces and incentives can provide their own tabulation environments. These providers may have a monetization model where their tabulators are available in a tabulator marketplace.

In one embodiment, the connection tabulator 30 may be an analog counting device. For example, the connection tabulator 30 may comprise a rotary number system that increments based on connections of the component. In one embodiment, the connection tabulator 30 may be an electronic device such as a tablet on which various tabulation software(s) can be installed and made available to the end-user.

Figure 6:
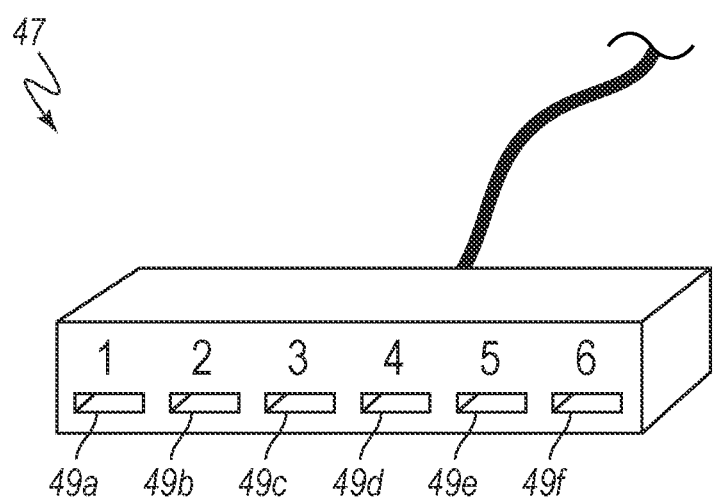
FIG. 6 is diagram of a detector for a NuMS, such as the NuMS of FIGS. 2-5, according to an embodiment of the present disclosure.

FIG. 6 is diagram of a detector 47 for a NuMS, such as the NuMS 101 of FIGS. 2-5, according to an embodiment of the present disclosure. While the NuMS 101 of FIGS. 3-5 is illustrated as having a detector 17, 27 for each respective device 16, 26, each coupled to disparate AC interface 12, 22, this is for convenience of the disclosure and not by way of limitation. A detector 47 for a NuMS 101 may comprise multiple detector circuits in a unitized housing. In one embodiment, the detector 47 may comprise a software or firmware component that is capable of distinctly identifying each device connected to the detector 47 and a member of a pool of devices assigned within the NuMS. In the example of FIG. 6, the detector 47 is shown having six ports 49a-49f. Each of the ports 49a-49f may have a dedicated detector circuit, or subsystem, configured to detect a connection of a device, such as the devices 16, 26 of FIGS. 3-5. The detector 47 may be configured to associate particular characteristics of an electrical coupling to a particular device. In other words, the detector 47 may be configured to discriminate between connections of each device that may coupled to the detector 47. In one embodiment, each port 49a-49f may be assigned to a particular device such that when a device is connected to a port 49a-49f, the connection is related to the assigned device (and, hence, the relevant user), regardless of what device is actually coupled at the particular port 49a-49f. By way of example, if the port 49a is assigned to the device of a particular child, and device connected to port 49a may be credited as a connection of the device of the particular child. In one embodiment, the detector 47 may be configured to identify a connection from a particular device regardless of to which of the ports 49a-49f a particular device is connected. In other words, a connection of a particular device may be related to that particular device regardless of the port 49a-49f to which the device is connected. The illustration of six ports 49a-49f is for convenience of the disclosure and not a limitation. The present disclosure anticipates that the detector 47 may have more or fewer ports 49a-49f. In one embodiment, the detector 47 may comprise a different connection hardware than a port, such as, e.g., a power outlet, an inductive charging puck, etc. In one embodiment, the detector 47 may be configured to receive, at one of the ports 49a-49f, a connection from another detector 47. In one embodiment, the detector 47 may comprise a capability to perform at least a portion of data tabulation or aggregation. In one embodiment, the detector 47 may further comprise a display to render a visible output of the aggregation or tabulation. Identification of a particular device may be done by measuring unique characteristics of the power consumption and/or other electrically distinct characteristics (a so-called "fingerprint") of the particular device. The connection tabulator may be configured or configurable to permit assignment or association of connection time to a particular device charging signature. For example unique characteristics of the power draw could be used to uniquely identify devices. These unique characteristics could then be matched to a database of device signatures (for example if a signature matches an Apple iPad®, then assign tabulation to "iPad" (or to a media access controller identifier (MAC ID) for the particular device, etc.). In one embodiment, users (or an administrative user) may be able to manually create user friendly labels, e.g., "Mom's iPad," "Mom's phone," etc. These labels may be associated to an identifiable and unique fingerprint or other data that are measurable for the device (for example unique power draw characteristics).

While various aspects and embodiments have been disclosed herein, other aspects and embodiments are contemplated. The various aspects and embodiment disclosed herein are for purposes of illustration and are not intended to be limiting. It will be apparent to those having skill in the art that many changes may be made to the details of the above-described embodiments without departing from the underlying principles of the disclosure. The scope of the present disclosure should, therefore, be determined only by the following claims.

What is claimed is:

1. A non-use monitoring system for one or more personal electronic devices, comprising:
   an electrical charging circuit to couple to a first personal electronic device;
   a detector configured to detect a first electrical coupling of the first personal electronic device to the electrical charging circuit and configured to detect at least one of a power flow and a data flow at the first personal electronic device to determine whether the first personal electronic device is in a state of use or non-use while coupled to the electrical charging circuit, and further configured to generate a first signal indicating a first non-use duration of the first electrical coupling of the first personal electronic device to the electrical charging circuit, and wherein the detector is also configured to detect a second electrical coupling of the first personal electronic device to the electrical charging circuit and generate a second signal indicating a second non-use duration of the second electrical coupling of the first electrical device to the electrical charging circuit; and
   a connection tabulator to generate a first non-use aggregation comprising the sum of the first non-use duration of the first electrical coupling of the first personal electronic device to the electrical charging circuit and the second non-use duration of the second electrical coupling of the first personal electronic device to the electrical charging circuit and to cause the first non-use aggregation to be rendered to a display.

2. The non-use monitoring system of claim 1, wherein the connection tabulator aggregates to the first non-use aggregation one or more additional non-use durations of electrical coupling of the first personal electronic device to the electrical charging circuit.

3. The non-use monitoring system of claim 1, wherein the detector is capable of detecting a first and second electrical coupling of a second personal electronic device to the electrical charging circuit.

4. The non-use monitoring system of claim 2, wherein the detector is configured to uniquely identify a plurality of personal electronic devices.

5. The non-use monitoring system of claim 4, wherein signals generated by the detector are uniquely associated to each personal electronic device of the plurality of personal electronic devices.

6. The non-use monitoring system of claim 5, wherein the connection tabulator generates a non-use aggregation for each personal electronic device of the plurality of personal electronic devices.

7. The non-use monitoring system of claim 6, wherein the connection tabulator causes the non-use aggregation for each personal electronic device of the plurality of personal electronic devices to be rendered to a display.

8. The non-use monitoring system of claim 1, wherein the first non-use aggregation is rendered to a display at the connection tabulator.

9. The non-use monitoring system of claim 1, wherein the first non-use aggregation is rendered at a display of the first personal electronic device.

10. The non-use monitoring system of claim 1, wherein the first non-use aggregation is rendered at a display of at least one of a desktop computing device, a handheld computing device, and a digital picture frame.

11. The non-use monitoring system of claim 1, wherein the connection tabulator associated the first non-use aggregation to a user-defined identifier.

12. The non-use monitoring system of claim 7, wherein the connection tabulator causes a relative comparison of the non-use aggregation for each personal electronic device of the plurality of personal electronic devices to be rendered to the display.

13. A method for monitoring non-use of one or more personal electronic devices comprising:
    detecting by a detector a first connection of a first personal electronic device to a charging circuit;
    detecting at least one of a power flow and a data flow at the first personal electronic device to determine whether the first personal electronic device is in a state of use or non-use while coupled to the electrical charging circuit;
    generating by the detector a first signal indicating a first non-use duration of the first connection of the first personal electronic device to the charging circuit;

detecting by the detector a second connection of the first personal electronic device to the charging circuit;

detecting at least one of a power flow and a data flow at the first personal electronic device to determine whether the first personal electronic device is in a state of use or non-use while coupled to the electrical charging circuit;

generating by the detector a second signal indicating a second non-use duration of the second connection of the first personal electronic device to the charging circuit;

generating by a connection tabulator a first non-use aggregation comprising a sum of the first non-use duration of the first connection of the first personal electronic device to the charging circuit and the second non-use duration of the second connection of the first personal electronic device to the charging circuit; and rendering to an electronic display the first non-use aggregation.

14. The method of claim 13, further comprising:

detecting by a detector a first connection of a second personal electronic device to the charging circuit;

detecting at least one of a power flow and a data flow at the second personal electronic device to determine whether the second personal electronic device is in a state of use or non-use while coupled to the electrical charging circuit;

generating by the detector a first signal indicating a first non-use duration of the first connection of the second personal electronic device to the charging circuit;

detecting by the detector a second connection of the second personal electronic device to the charging circuit;

detecting at least one of a power flow and a data flow at the second personal electronic device to determine whether the second personal electronic device is in a state of use or non-use while coupled to the electrical charging circuit;

generating by the detector a second signal indicating a second non-use duration of the second connection of the second personal electronic device to the charging circuit;

generating by a connection tabulator a second non-use aggregation comprising a sum of the first non-use duration of the first connection of the second personal electronic device to the charging circuit and the second non-use duration of the second connection of the second personal electronic device to the charging circuit; and rendering to an electronic display the second non-use aggregation.

15. The method of claim 14, wherein rendering to the electronic display the first non-use aggregation and rendering to the electronic display the second non-use aggregation comprises comparatively displaying the first and second non-use aggregations on the electronic display.

16. The method of claim 15, further comprising awarding an award point for each connection of the first personal electronic device based on a point award triggering event.

17. The method of claim 16, wherein the award point is included in the first non-use aggregation.

* * * * *